(12) United States Patent
Mayer et al.

(10) Patent No.: US 11,484,847 B2
(45) Date of Patent: Nov. 1, 2022

(54) MIXER ASSEMBLY UNIT

(71) Applicant: Purem GmbH, Neunkirchen (DE)

(72) Inventors: Michael Mayer, Bempflingen (DE); Heike Többen, Uhingen (DE); Christoph Illi, Esslingen (DE); Wolfgang Datz, Tübingen (DE); Konstantin Kappes, Stuttgart (DE); Tobias Wolf, Köngen (DE); Philipp Weinmann, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/219,285

(22) Filed: Mar. 31, 2021

(65) Prior Publication Data

US 2021/0308635 A1 Oct. 7, 2021

(30) Foreign Application Priority Data

Apr. 1, 2020 (DE) ..................... 10 2020 109 022.6

(51) Int. Cl.
*F01N 3/20* (2006.01)
*B01F 23/213* (2022.01)
*F01N 3/28* (2006.01)
*B01F 25/00* (2022.01)

(52) U.S. Cl.
CPC ........ *B01F 23/2132* (2022.01); *F01N 3/2066* (2013.01); *F01N 3/2892* (2013.01);
(Continued)

(58) Field of Classification Search
CPC .. F01N 3/2066; F01N 3/2892; F01N 2240/20; F01N 2610/02; F01N 13/02;
(Continued)

(56) References Cited

U.S. PATENT DOCUMENTS

| 2003/0079467 A1* | 5/2003 | Liu ..................... B01F 3/04049 60/286 |
| 2011/0308234 A1* | 12/2011 | De Rudder ......... B01F 3/04049 60/295 |

(Continued)

FOREIGN PATENT DOCUMENTS

| CN | 211737255 U * 10/2020 |
| DE | 102014112651 A1   3/2016 |

(Continued)

*Primary Examiner* — Devon C Kramer
*Assistant Examiner* — Kelsey L Stanek
(74) *Attorney, Agent, or Firm* — McGlew and Tuttle, P.C.

(57) ABSTRACT

A mixer assembly unit, for an exhaust system exhaust gas treatment unit of an internal combustion engine, mixes exhaust gas discharged by the internal combustion engine with reactant. A mixing section (12), downstream in relation to a reactant release device (14), mixes exhaust gas, flowing in an exhaust gas flow direction, with reactant. The mixing section includes a core flow duct (34), extending in a direction of a mixing section longitudinal axis (L), through which a first exhaust gas partial stream (T1) flows. A second exhaust gas partial stream (T2) flows through a jacket flow duct (36) surrounding the core flow duct and separated from the core flow duct by an inner wall (30). The reactant release device releases reactant into the core flow duct or/and into the first exhaust gas partial stream. A mixer (38) is provided at an upstream end area (22) of the mixing section.

14 Claims, 2 Drawing Sheets

(52) U.S. Cl.
CPC ..... *B01F 2025/931* (2022.01); *F01N 2240/20* (2013.01); *F01N 2610/02* (2013.01)

(58) Field of Classification Search
CPC ........ F01N 13/10; F01N 3/035; F01N 3/0842; B01F 3/04049; B01F 2005/0091; F02D 41/029
USPC .......................................... 60/295, 301, 324
See application file for complete search history.

(56) References Cited

U.S. PATENT DOCUMENTS

| | | | |
|---|---|---|---|
| 2013/0305696 A1* | 11/2013 | Loman | F01N 13/141 60/295 |
| 2014/0033686 A1* | 2/2014 | Fischer | B01F 25/4315 60/286 |
| 2014/0196442 A1* | 7/2014 | Katou | F01N 3/10 60/286 |
| 2014/0325967 A1* | 11/2014 | Kimura | B01F 5/0065 60/286 |
| 2015/0308316 A1* | 10/2015 | Li | F01N 13/009 60/295 |
| 2019/0112962 A1* | 4/2019 | Gaiser | F01N 13/141 |

FOREIGN PATENT DOCUMENTS

| | | | | |
|---|---|---|---|---|
| DE | 102017124276 A1 | | 4/2019 | |
| EP | 3141719 A1 | * | 3/2017 | ............... F01N 5/02 |
| EP | 3141719 A1 | | 3/2017 | |
| WO | 2817/178094 A1 | | 10/2017 | |
| WO | WO-2017178094 A1 | * | 10/2017 | ........... F01N 3/2892 |

* cited by examiner

MIXER ASSEMBLY UNIT

CROSS REFERENCE TO RELATED APPLICATIONS

This application claims the benefit of priority under 35 U.S.C. § 119 of German Application 10 2020 109 022.6, filed Apr. 1, 2020, the entire contents of which are incorporated herein by reference.

TECHNICAL FIELD

The present invention pertains to a mixer assembly unit for an exhaust gas treatment unit for an exhaust system of an internal combustion engine for mixing exhaust gas discharged by the internal combustion engine with reactant.

TECHNICAL BACKGROUND

A mixer assembly unit for an exhaust system of an internal combustion engine according to the preamble of claim 1, in which the exhaust gas stream discharged by an internal combustion engine is split in a mixing section into a first exhaust gas partial stream flowing through a core flow duct and into a second exhaust gas partial stream flowing through a jacket flow duct, is known from DE 10 2017 124 276 A1. The jacket flow duct is defined radially outwards by an outer wall elongated in the direction of a mixing section longitudinal axis and is separated radially inwards by an inner wall from the core flow duct. A reactant release device, generally also called injector, is provided upstream in relation to an upstream end area of the mixing section or in relation to an inflow opening of the core flow duct. This reactant release device releases liquid reactant in the form of a spray cone such that at least the majority of the reactant enters into the core flow duct.

In order to support the mixing of exhaust gas and reactant, an electrically energizable heater is, furthermore, associated with the inner wall in this prior-art mixer assembly unit. The inner wall is heated by the electrically energizable heater, so that the reactant reaching it as a spray or in the form of droplets evaporates and the reactant vapor released into the first exhaust gas partial stream mixes with the exhaust gas to an increased extent.

SUMMARY

An object of the present invention is to provide a mixer assembly unit for an exhaust gas treatment unit for an exhaust system of an internal combustion engine, with which an improved mixing of exhaust gas and reactant is achieved with a structurally simple embodiment.

This object is accomplished according to the present invention by a mixer assembly unit for an exhaust gas treatment unit for an exhaust system of an internal combustion engine for mixing exhaust gas discharged by the internal combustion engine with reactant, comprising a reactant release device and, downstream in an exhaust gas flow direction in relation to the reactant release device, a mixing section for mixing exhaust gas with reactant released into the exhaust gas by the reactant release device, wherein the mixing section comprises a core flow duct, which extends in the direction of a mixing section longitudinal axis and through which a first exhaust gas partial stream can flow, and a jacket flow duct, which encloses the core flow duct, is separated from the core flow duct by an inner wall and through which a second exhaust gas partial stream can flow, wherein the reactant release device is arranged for releasing reactant essentially into the core flow duct or/and into the first exhaust gas partial stream.

This mixer assembly unit is characterized in that a mixer is provided at an upstream end area of the mixing section.

An intense mixing of exhaust gas and reactant and also a longer residence time in the mixing section are brought about by the mixer provided at the inlet area of the mixing section already at the time of entry of exhaust gas and reactant into the core flow duct due to the swirling generated by means of the mixer. Supported by the second exhaust gas partial stream flowing in the jacket flow duct and by the heating of the inner wall, brought about by this second exhaust gas partial stream, efficient mixing of exhaust gas and reactant is achieved in the mixing section.

To support the efficient mixing of exhaust gas and reactant, it is further proposed that a length of extension of the core flow duct or/and of the jacket flow duct in the direction of the mixing section longitudinal axis be greater than a cross-sectional dimension, preferably the diameter, of the core flow duct.

Provisions may further be made for a specific introduction of the reactant into the core flow duct for the reactant release device or/and the mixer to be carried at a housing wall located opposite an inflow opening of the core flow duct in the direction of the mixing section longitudinal axis at a spaced location from an inflow opening of the core flow duct.

In order to make it possible to bring about an interaction between the exhaust gas discharged by an internal combustion engine and the reactant injected into the exhaust gas stream by means of the reactant release device in the area of the mixer, the mixer may comprise a circumferential wall, which encloses the mixing section longitudinal axis and encloses a mixer volume, wherein a plurality of exhaust gas inlet openings following one another in the circumferential direction are provided in the mixer circumferential wall.

In an especially preferred embodiment, a swirling flow generation element may be provided in association with at least one and preferably each exhaust gas inlet opening. A swirling flow, which supports, on the one hand, a prolonged residence time of the mixture of exhaust gas and reactant in the mixing section, and ensures, on the other hand, that an intensified interaction will develop with the inner surface of the inner wall heated by the second exhaust gas partial stream based on the centrifugal forces acting in the swirling flow, is thus generated in the area of the mixer or on entry into the mixing section.

Provisions may be made now, for example, for at least one and preferably each swirling flow generation element to comprise a deflecting wing extending radially inwards into the mixer volume from an edge area of the associated exhaust gas inlet opening and in the circumferential direction, or/and for at least one and preferably each swirling flow generation element to comprise a deflecting wing extending from an edge area of the associated exhaust gas inlet opening radially outwards away from the mixer volume and in the circumferential direction.

The mixing effect of the mixer can be intensified by the mixer circumferential wall being configured as a circumferential wall expanding radially in the direction of the upstream end area of the mixing section.

In order to ensure that essentially all the reactant released by the reactant release device will enter the core flow duct, a downstream end area of the mixer circumferential wall may be positioned such that it meshes with the core flow duct in the upstream end area of the mixing section.

In order to guarantee that a sufficient quantity of exhaust gas can enter as the first exhaust gas partial stream into the core flow duct, it is proposed that a ring-like (ring shape) flow duct be formed in the upstream end area of the mixing section between the downstream end area of the mixer circumferential wall and the inner wall of the upstream end area of the mixing section.

An upstream end area of the mixer circumferential wall may be fixed at the housing wall.

To mount the reactant release device, a reactant release device carrier may be provided at the housing wall, and a reactant receiving volume open to the mixer volume may be provided in the reactant release device carrier.

The present invention pertains, furthermore, to an exhaust gas treatment unit for an exhaust system of an internal combustion engine, comprising at least one mixer assembly unit configured according to the present invention.

To feed exhaust gas to the mixing section, an exhaust gas feed volume may be provided in an exhaust gas feed housing for feeding exhaust gas to the mixer essentially from radially outwards in relation to the mixing section longitudinal axis.

The housing wall may be provided at the exhaust gas feed housing for a configuration that can be embodied in a structurally simple manner.

To release the mixture of exhaust gas and reactant, which is generated in the mixing section, an exhaust gas removal volume may be provided in an exhaust gas removal housing for removing exhaust gas mixed with reactant from a downstream end area of the mixing section to at least one SCR catalytic converter device.

The mixing section may comprise an outer wall defining the jacket flow duct radially outwards. For a stable embodiment that can be configured in a simple manner, this outer wall may be connected in the upstream end area of the mixing section to the exhaust gas feed housing or/and it may be connected to the exhaust gas removal housing in the downstream end area of the mixing section.

Further, the inner wall may extend in the upstream direction beyond the outer wall into the exhaust gas feed volume formed in the exhaust gas feed housing in the upstream end area of the mixing section in order to support the splitting of the exhaust gas stream into the first exhaust gas partial stream and into the second exhaust gas partial stream in the upstream end area of the mixing section. In the downstream end area, the inner wall may end in front of the outer wall in the exhaust gas flow direction.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
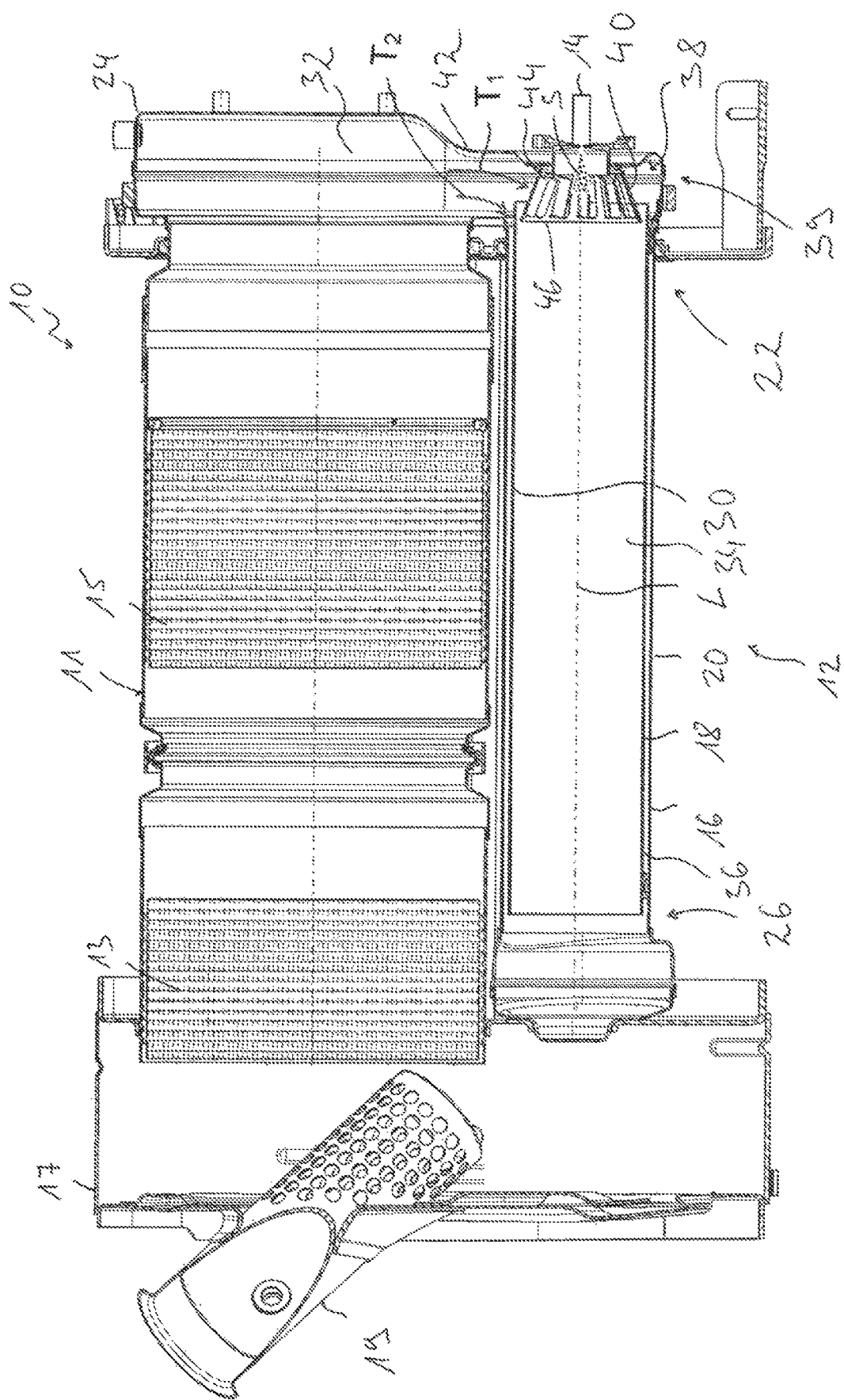
FIG. 1 is a longitudinal sectional view of an exhaust gas treatment unit for an exhaust system of an internal combustion engine, which shows the flow area leading to a mixing section together with the mixing section.

Referring to the drawings, FIG. 1 shows a exhaust gas treatment unit for an exhaust system of an internal combustion engine, for example, in a utility vehicle, said exhaust gas treatment unit being generally designated by 10. The exhaust gas treatment unit 10 comprises as the essential system area a mixing section 12, which will be explained in detail below, and in which the exhaust gas discharged by an internal combustion engine is mixed with the reactant discharged by a reactant release device 14 schematically shown in FIG. 2, for example, with a urea-water solution. Following one another in the flow direction, a diesel oxidation catalytic converter device 13 and a particle filter 15 are arranged in a tubular housing area 11 in an area of the exhaust gas treatment unit 10, which area is located upstream in relation to the mixing section. An inlet housing 17, into which the exhaust gas discharged from the internal combustion engine enters via an exhaust gas inlet 19, is provided upstream in relation to the housing area 11.

The mixing section 12 comprises as essential system areas two pipes 16, 18, which are arranged, for example, essentially coaxially in relation to one another, in relation to a mixing section longitudinal axis L. The pipe 16 provides an outer wall 20, with which the mixing section 12 is connected to an exhaust gas feed housing, which is generally designated by 24 and joins the tubular housing area 11, and it is connected to an exhaust gas removal housing generally designated by 28 in a downstream end area 26 of the mixing section 12.

The pipe 18 provides an inner wall 30, which extends in the upstream end area 22 of the mixing section 12 in the upstream direction beyond the pipe 16 providing the outer wall 20 into an exhaust gas feed volume 32 formed in the exhaust gas feed housing 24. In the downstream end area 26 of the mixing section 12, the pipe 18 forming the inner wall 30 ends in the flow direction already in front of the pipe 16 providing the outer wall 20, so that the pipe 16 and the outer wall 26 extend beyond the pipe 16 providing the inner wall 30 in the exhaust gas flow direction.

The volume enclosed by the inner wall 30 provides a core flow duct 34 in the mixing section 12, and the ring-like (ring shape) volume formed between the inner wall 30 and the outer wall 20 provides a jacket flow duct 36, which is, for example, coaxial to the core flow duct 34. A part of the exhaust gas stream, fed via the exhaust gas feed volume 32 in the exhaust gas feed housing 24, enters the core flow duct 34 as a first exhaust gas partial stream T1. The remaining part of the exhaust gas stream being fed via the exhaust gas feed volume 32 enters into the jacket flow duct 36 in the upstream end area 22 of the mixing section 12. The consequence of this is that, on the one hand, the first exhaust gas partial stream T1 is thermally insulated radially outwards by the second exhaust gas partial stream T2, and, on the other hand, the inner wall 30 absorbs heat from the second exhaust gas partial stream T2 flowing in the jacket flow duct 36 and is thus heated.

A mixer, generally designated by 38, is provided in the upstream end area 22 of the mixing section 12. Together with the mixing section 12, the mixer 38 forms the essential components of a mixer assembly unit generally designated by 39 and is configured with a mixer circumferential wall 40, which is fixed in an upstream end area to a housing wall 42 of the exhaust gas feed housing 24, for example, by the mixer housing wall 40 being bent radially outwards and being fixed on the inner side of the housing wall 42, for example, by welding. This mixer circumferential wall 40 has a configuration expanding, for example, conically in relation to the mixing section longitudinal axis L between this upstream end area 44 of the mixer circumferential wall 40 and a downstream end area 46 of the mixer circumferential wall 40. A ring-like (ring shape) flow duct 48 is formed in the upstream end area 22 of the mixing section 12 between the downstream end area 46 of the mixer circumferential wall 40 and the inner wall 30, so that a part of the first exhaust gas partial stream T1 enters the core flow duct 34 through this ring-like (ring shape) flow duct 48.

The remaining or larger part of the first exhaust gas partial stream T1 enters via a plurality of exhaust gas inlet openings 50 following one another in the circumferential direction in the mixer circumferential wall 40 into a mixer volume 52 enclosed by this mixer circumferential wall 40. A swirling flow generation element 54 in the form of a deflecting wing extending in the circumferential direction and projecting inwards from the mixer circumferential wall 40 is provided in association with each exhaust gas inlet opening 50. Since the swirling flow generation elements 54 preferably extend in the same circumferential direction and radially inwards, a swirling flow is generated during the entry of exhaust gas into the mixer volume 52, and this swirling flow ensures, on the one hand, that the first partial stream T1 is forced to have a longer residence time in the core flow duct 34 based on the greater flow section during the farther flow into the core flow duct 34, and that, on the other hand, there will be an increased interaction with the inner surface of the inner wall 30 and hence an increased thermal interaction between the exhaust gas and the inner wall 30 based on the centrifugal forces generated with the swirling flow.

It should be noted that the swirling flow generation elements 54 or some of the swirling flow generation elements 54 could likewise be configured such that they extend radially outwards, i.e., in the direction away from the mixing volume 52 and extending in the circumferential direction, in order to generate such a swirling flow. Some of the swirling flow generation elements 54 could also be configured such that they extend inwards and some outwards. Further, it should be noted that the wing-like (wing shape) swirling flow generation elements may be formed in the mixer 38 configured as a shaped sheet metal part by U-shaped slots being prepared in the mixer circumferential wall 40 and by the straps thus formed as deflecting wings then being bent over inwards or outwards to prepare the exhaust gas inlet openings 50, thus extending starting from an edge area of a respective associated exhaust gas inlet opening 50.

Further, a reactant release device carrier 56 having a, for example, pot-like (pot shape) configuration is fixed, with a circumferential wall 58 of carrier 56, to the housing wall 42 by welding. The reactant release device 14 is carried at the bottom wall 60 of the reactant release device carrier 56 such that this reactant release device 14 releases reactant in the direction of a reactant receiving volume 62 formed in the reactant release device carrier 56. The reactant receiving volume 62 is open towards the mixer volume 52, so that the reactant released by the reactant release device 14 in the form of a spray cone S or in the form of droplets is released through the reactant receiving volume 62 into the mixer volume 52 and it will then come into contact in the mixer volume 52 with the exhaust gas entering this mixer volume 52 through the exhaust gas inlet openings 50.

Based on the swirling flow generated in the mixer volume 52 or on the swirling, which also accompanies this, mixing of exhaust gas and reactant will already take place in the mixer volume 52. This mixing is then intensified in the mixing section 12 during the flow of the swirling flow in the direction of the downstream end area 26 of the mixing section 12, and hence the evaporation of the initially still liquid reactant and hence also an improved mixing with the exhaust gas are supported based on the thermal interaction of the reactant introduced in the form of a spray cone with the inner wall 30. Efficient mixing of exhaust gas and reactant is further supported by the mixer 38 with its mixer circumferential wall 40 being introduced in the downstream end area 46 thereof into the core flow duct 34 or into the inner wall 30 through an inflow opening 64 of the core flow duct 34, so that the mixer circumferential wall 40 is axially overlapped with the inner wall 30 in the direction of the mixing section longitudinal axis L. This also guarantees that the entire amount of reactant released by the reactant release device 14 will enter into the core flow duct and an entry of reactant into the jacket flow duct 36 is prevented from occurring to the greatest extent possible. Further, the fact that the mixing section 12 has a comparatively great axial length, which is especially greater than the cross-sectional dimension, i.e., for example, the diameter, of the core flow duct, also contributes to a very good mixing of exhaust gas and reactant.

The second exhaust gas partial stream T2 and the first exhaust gas partial stream T1 mixed with reactant are merged again at the downstream end area 26. On entry into the exhaust gas removal housing 28, the recombined exhaust gas stream is then deflected in an exhaust gas removal volume 68 in relation to the mixing section longitudinal axis L radially or approximately by 90° before the exhaust gas stream flows, after another deflection by approximately 90°, towards an SCR catalytic converter device 66, which is arranged in a tubular housing area 65 joining the exhaust gas removal housing 28, so that the selective catalytic reduction can take place there to reduce the percentage of nitrogen oxides in the exhaust gas.

Figure 2:
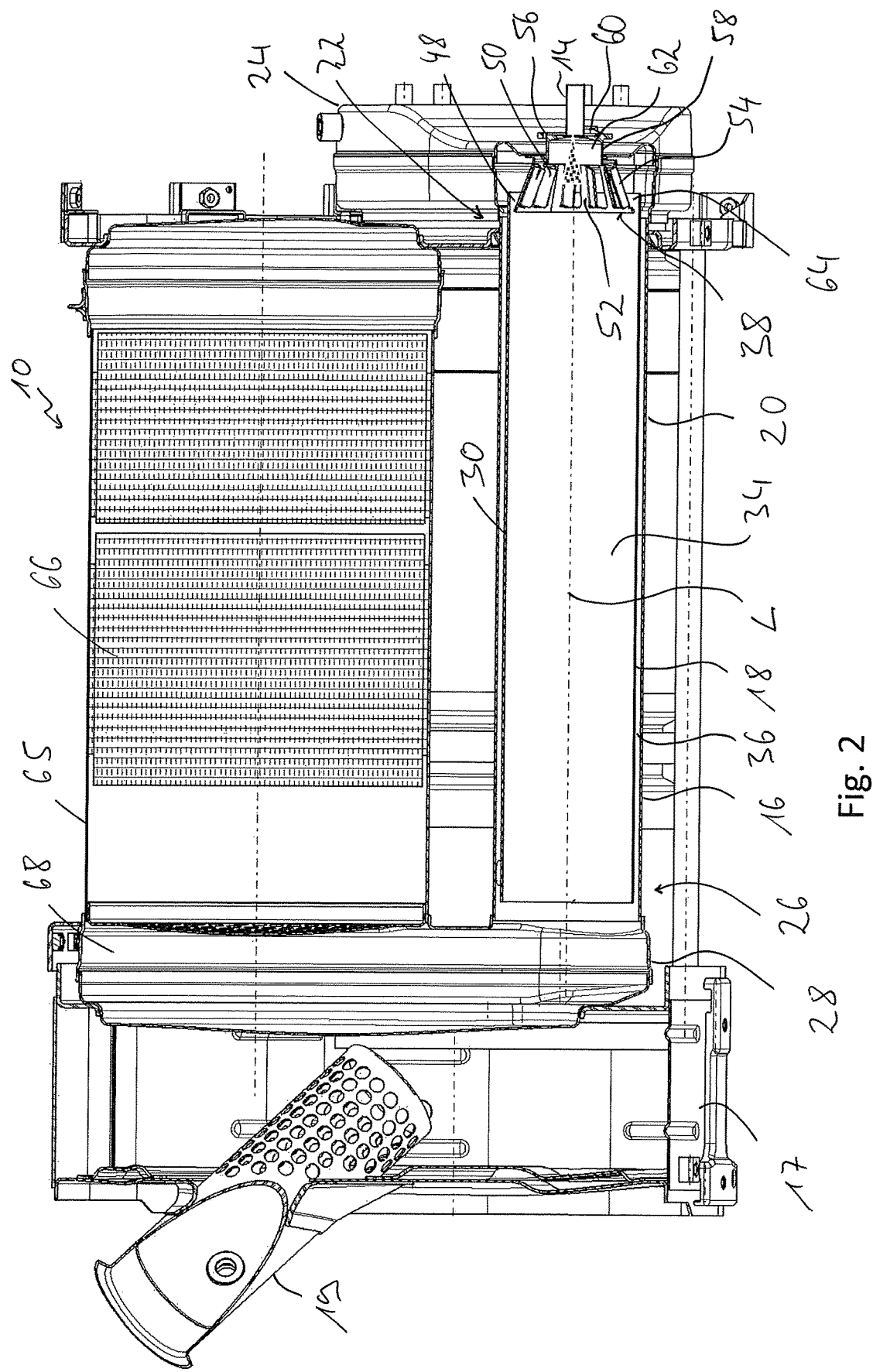
FIG. 2 is a longitudinal sectional view of the exhaust gas treatment unit according to FIG. 1, which shows the flow area leading away from the mixing section together with the mixing section.

It should be noted that the exhaust gas treatment unit shown in FIGS. 1 through 3 may be varied in many different aspects. For example, a plurality of mixing sections with respective mixers associated with them and with respective reactant release devices associated with them may thus be provided in parallel to one another or may be connected to the exhaust gas feed housing. Adjoining the exhaust gas removal housing, a plurality of mutually simultaneously acting SCR catalytic converter devices accommodated each in separate, tubular housings, may be provided adjoining the exhaust gas removal housing.

While specific embodiments of the invention have been shown and described in detail to illustrate the application of the principles of the invention, it will be understood that the invention may be embodied otherwise without departing from such principles.

What is claimed is:

1. A mixer assembly unit for an exhaust gas treatment unit for an exhaust system of an internal combustion engine for mixing exhaust gas discharged by the internal combustion engine with reactant, the mixer assembly unit comprising:
    a reactant release device;
    a mixing section configured to mix exhaust gas with reactant released by the reactant release device into exhaust gas located downstream in an exhaust gas flow direction in relation to the reactant release device, wherein the mixing section comprises:
        a core flow duct extending in a direction of a mixing section longitudinal axis and configured for flow of a first exhaust gas partial stream therethrough;

a jacket flow duct enclosing the core flow duct and separated from the core flow duct by an inner wall, the jacket flow duct being configured for flow of a second exhaust gas partial stream therethrough, wherein the reactant release device is arranged for releasing the entire amount of reactant released thereby into the core flow duct or into the first exhaust gas partial stream or into the core flow duct and into the first exhaust gas partial stream, such as to enter into the core flow duct; and a mixer provided at an upstream end area of the mixing section, the mixer comprising a mixer circumferential wall enclosing the mixing section longitudinal axis and enclosing a mixer volume, a plurality of exhaust gas inlet openings following one another in a circumferential direction being provided in the mixer circumferential wall, the mixer circumferential wall having a configuration widening radially towards the upstream end area of the mixing section, a downstream end area of the mixer circumferential wall being positioned so as to extend into the core flow duct in the upstream end area of the mixing section, such that a ring shape flow duct is formed in the upstream end area of the mixing section between the downstream end area of the mixer circumferential wall and the inner wall.

2. The mixer assembly unit in accordance with claim 1, wherein:
a length of extension of the core flow duct, in the direction of the mixing section longitudinal axis, is greater than a cross-sectional dimension of the core flow duct;
a length of extension of the jacket flow duct, in the direction of the mixing section longitudinal axis, is greater than a cross-sectional dimension of the core flow duct; or
the length of extension of the core flow duct, in the direction of the mixing section longitudinal axis, is greater than a cross-sectional dimension of the core flow duct and the length of extension of the jacket flow duct, in the direction of the mixing section longitudinal axis, is greater than a cross-sectional dimension of the core flow duct.

3. The mixer assembly unit in accordance with claim 1, further comprising a housing wall extending spaced from an inflow opening of the core flow duct with respect to the direction of the mixing section longitudinal axis and located opposite the inflow opening, wherein:
the reactant release device is carried at the housing wall; or
the mixer is carried at the housing wall; or
the reactant release device is carried at the housing wall and the mixer is carried at the housing wall.

4. The mixer assembly unit in accordance with claim 3, wherein
an upstream end area of the mixer circumferential wall is fixed at the housing wall.

5. The mixer assembly unit in accordance with claim 3, further comprising reactant release device carrier, wherein
the reactant release device carrier is provided at the housing wall, wherein a reactant receiving volume open to the mixer volume is provided in the reactant release device carrier.

6. The mixer assembly unit in accordance with claim 1, wherein a swirling flow generation element is associated with at least one of the exhaust gas inlet openings.

7. The mixer assembly unit in accordance with claim 6, wherein:

the swirling flow generation element associated with at least one of the exhaust gas inlet openings comprises a deflecting wing extending from an edge area of the associated exhaust gas inlet opening radially inwards into the mixer volume and extends in the circumferential direction; or
the swirling flow generation element associated with at least one of the exhaust gas inlet openings comprises a deflecting wing extending radially outwards away from the mixer volume from an edge area of the associated exhaust gas inlet opening and in the circumferential direction; or
the swirling flow generation element associated with at least one of the exhaust gas inlet openings comprises the deflecting wing extending from the edge area of the associated exhaust gas inlet opening radially inwards into the mixer volume and extends in the circumferential direction and the swirling flow generation element associated with at least one of the exhaust gas inlet openings comprises the deflecting wing extending radially outwards away from the mixer volume from the edge area of the associated exhaust gas inlet opening and in the circumferential direction.

8. An exhaust gas treatment unit for an exhaust system of an internal combustion engine, exhaust gas treatment unit comprising: at least one mixer assembly unit, the at least one mixer assembly unit comprising:
a reactant release device;
a mixing section configured to mix exhaust gas with reactant released by the reactant release device into exhaust gas located downstream in an exhaust gas flow direction in relation to the reactant release device, wherein the mixing section comprises:
a core flow duct extending in a direction of a mixing section longitudinal axis and configured for flow of a first exhaust gas partial stream therethrough;
a jacket flow duct enclosing the core flow duct and separated from the core flow duct by an inner wall, the jacket flow duct being configured for flow of a second exhaust gas partial stream therethrough, wherein the reactant release device is arranged for releasing the entire amount of reactant released thereby into the core flow duct or into the first exhaust gas partial stream or into the core flow duct and into the first exhaust gas partial stream, such as to enter into the core flow duct; and
a mixer provided at an upstream end area of the mixing section, the mixer comprising a mixer circumferential wall enclosing the mixing section longitudinal axis and enclosing a mixer volume, a plurality of exhaust gas inlet openings following one another in a circumferential direction being provided in the mixer circumferential wall, the mixer circumferential wall having a configuration widening radially towards the upstream end area of the mixing section, a downstream end area of the mixer circumferential wall being positioned so as to extend into the core flow duct in the upstream end area of the mixing section, such that a ring shape flow duct is formed in the upstream end area of the mixing section between the downstream end area of the mixer circumferential wall and the inner wall.

9. The exhaust gas treatment unit in accordance with claim 8, further comprising an exhaust gas feed housing with an exhaust gas feed volume for feeding exhaust gas to the mixer from radially outwards in relation to the mixing section longitudinal axis.

10. The exhaust gas treatment unit in accordance with claim 9, wherein the exhaust gas treatment unit further comprises a housing wall extending spaced from an inflow opening of the core flow duct with respect to the direction of the mixing section longitudinal axis and located opposite the inflow opening, the housing wall being provided at the exhaust gas feed housing and wherein:

the reactant release device is carried at the housing wall; or the mixer is carried at the housing wall; or the reactant release device is carried at the housing wall and the mixer is carried at the housing wall.

11. The exhaust gas treatment unit in accordance with claim 8, further comprising an exhaust gas removal housing with an exhaust gas removal volume, for removing exhaust gas mixed with reactant from a downstream end area of the mixing section to at least one Selective-Catalytic-Reduction catalytic converter device.

12. The exhaust gas treatment unit in accordance with claim 11, further comprising an exhaust gas feed housing with an exhaust gas feed volume for feeding exhaust gas to the mixer from radially outwards in relation to the mixing section longitudinal axis, wherein the mixing section comprises an outer wall defining the jacket flow duct radially outward, wherein:

the outer wall is connected to the exhaust gas feed housing in the upstream end area of the mixing section; or the outer wall is connected to the exhaust gas removal housing in the downstream end area of the mixing section; or the outer wall is connected to the exhaust gas feed housing in the upstream end area of the mixing section and the outer wall is connected to the exhaust gas removal housing in the downstream end area of the mixing section.

13. The exhaust gas treatment unit in accordance with claim 12, wherein:

in the upstream end area of the mixing section, the inner wall extends beyond the outer wall into the exhaust gas feed volume formed in the exhaust gas feed housing; or the inner wall ends in front of the outer wall in the exhaust gas flow direction in the downstream end area of the mixing section; or in the upstream end area of the mixing section, the inner wall extends beyond the outer wall into the exhaust gas feed volume formed in the exhaust gas feed housing and the inner wall ends in front of the outer wall in the exhaust gas flow direction in the downstream end area of the mixing section.

14. A mixer assembly unit for an exhaust gas treatment unit for an exhaust system of an internal combustion engine for mixing exhaust gas discharged by the internal combustion engine with reactant, the mixer assembly unit comprising:

a reactant release device;

a mixing section configured to mix exhaust gas with reactant released by the reactant release device into exhaust gas located downstream in an exhaust gas flow direction in relation to the reactant release device, wherein the mixing section comprises:

a core flow duct extending in a direction of a mixing section longitudinal axis and configured for flow of a first exhaust gas partial stream therethrough;

a jacket flow duct enclosing the core flow duct and separated from the core flow duct by an inner wall, the inner wall defining at least a portion of the core flow duct, the jacket flow duct being configured for flow of a second exhaust gas partial stream therethrough, wherein the reactant release device is configured for releasing an entire amount of reactant released thereby into the core flow duct or into the first exhaust gas partial stream or into the core flow duct and into the first exhaust gas partial stream, such as to enter into the core flow duct;

an outer wall; and a mixer provided at an upstream end area of the mixing section, the mixer comprising a mixer circumferential wall enclosing the mixing section longitudinal axis and enclosing a mixer volume, the mixer further comprising a plurality of exhaust gas inlet openings following one another in a circumferential direction being provided in the mixer circumferential wall, the mixer circumferential wall having a configuration widening radially towards the upstream end area of the mixing section, the mixer circumferential wall comprising a downstream mixer circumferential wall end area and an upstream mixer circumferential wall end area, the downstream mixer circumferential wall end area being positioned in the core flow duct in the upstream end area of the mixing section such that a ring shape flow duct is formed in the upstream end area of the mixing section between the mixer circumferential downstream end area and the inner wall, the inner wall comprising an upstream inner wall end area, the outer wall comprising an upstream outer wall end area, the upstream inner wall end area extending beyond the upstream outer wall end area, the upstream mixer circumferential wall end area extending beyond the upstream inner wall end area and the upstream outer wall end area.

* * * * *